US006697762B1

United States Patent
Bush et al.

(10) Patent No.: US 6,697,762 B1
(45) Date of Patent: Feb. 24, 2004

(54) APPARATUS AND METHOD FOR ANALYZING BRITTLENESS OF A SYSTEM

(75) Inventors: Stephen Francis Bush, Latham, NY (US); John Erik Hershey, Ballston Lake, NY (US); Kirby Gannett Vosburgh, Schenectady, NY (US); Brock Estel Osborn, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 09/436,149

(22) Filed: Nov. 9, 1999

Related U.S. Application Data
(60) Provisional application No. 60/108,492, filed on Nov. 16, 1998.

(51) Int. Cl.⁷ .............................................. G05D 23/20
(52) U.S. Cl. ........................................ 702/182; 700/31
(58) Field of Search ............................. 700/38, 28, 29, 700/31–33, 39; 702/182, 183

(56) References Cited

U.S. PATENT DOCUMENTS

| | | | | |
|---|---|---|---|---|
| 3,960,320 A | * | 6/1976 | Slater | 236/15 R |
| 5,394,322 A | * | 2/1995 | Hansen | 700/37 |
| 6,021,396 A | * | 2/2000 | Ramaswamy et al. | 705/28 |
| 6,223,143 B1 | * | 4/2001 | Weinstock et al. | 703/17 |
| 6,272,449 B1 | * | 8/2001 | Passera | 703/2 |

OTHER PUBLICATIONS

Brittleness in the design of cooperative problem–solving systems: The effect on user performance. Smith et al., IEEE Transactions on systems, man and cybernetics, Part A Systems and Humans, vol. 27, No. 3, May 1997.*
Brittle System Analysis, Bush et al. arXiv:cs.NI/9904016 v1, pub. Apr. 22, 1999.*
Fundamental Furmulas of Physics, Menzel et al., Dover Publications, 1960. pp138–139.*
Instrumentation for Engineering Measurements, Second Edition, Dally et al. John Wiley & Sons, Inc. pp 526–536 and 545–549. 1993.*
Linear Control Systems, Melsa et al. McGraw–hill Book Company, pp 40–57, 1969.*

* cited by examiner

Primary Examiner—Marc S. Hoff
Assistant Examiner—Craig Steven Miller
(74) Attorney, Agent, or Firm—William Powell; Patrick K. Patnode

(57) ABSTRACT

The invention provides a computer implemented tool for analyzing the brittleness of a system with respect to at least one system performance measure. The tool comprises a statistical analyzer configured to receive at least one operating parameter input, o, and to provide at least one performance function output, f. The performance function output f provides an indication of system performance as a function of system operating parameter input o. A brittleness analyzer is coupled to the performance function output and is configured to provide a brittleness output based upon the performance function output f.

14 Claims, 2 Drawing Sheets

APPARATUS AND METHOD FOR ANALYZING BRITTLENESS OF A SYSTEM

CROSS REFERENCE TO RELATED APPLICATIONS

This application claims priority to and the benefit of the filing date of Provisional Application Ser. No. 60/108,492, filed Nov. 16, 1998, now expired entitled "Method of Modeling and Mitigating Brittle System Behavior" and incorporated herein by reference.

BACKGROUND OF THE INVENTION

The present invention relates generally to computer based apparatus and corresponding computer implemented methods for measurement, calibration, and correction of the performance of systems and their components, and more particularly to quality improvement and process optimization tools for analyzing the performance of systems.

An important aspect of the development process in developing systems for use in various industrial fields is establishing tolerance limits for system components. Tolerance limits, sometimes referred to as upper (USL) and lower (LSL) specification limits, define the allowable deviation of a component from a nominal value. A nominal value is a design, or theoretical value. Much research has focused on designing system components to maintain system performance within specified limits even as performance of system components ranges between upper and lower specification limits. According to traditional arithmetic tolerancing, all the tolerances of system components are arithmetically added together, i.e., stacked up, at the extremes of the component design tolerances to predict a worst case system variation. Another tolerancing technique, statistical tolerancing, attempts to predict probabilities of system performance falling outside specified limits in relation to probabilities of various combinations of out-of-tolerance variations in system components. The aim of these and other tolerancing techniques is to design components such that system performance remains within specified performance limits in spite of variations in component performance.

However, it is not always feasible or economical to design components such that a system performs within its specified limits in the face of worst case system variation, or in spite of predicted out-of-tolerance component performances. For some components, imposing such performance requirements results in the component being prohibitively expensive to manufacture. For other components the desired tolerance is technically or practically impossible to achieve. Furthermore, in some cases the degradation in system performance due to variations in the performance of some components is not significant, while in other cases the effect of component variations on system performance is drastic. Thus, there exist trade-offs to be considered in selecting and tolerancing system components in order to achieve a specified system performance goal. Unfortunately, the various tolerancing techniques available in the prior art fail to provide a disciplined approach for considering system behavior as system performance ranges outside desired performance limits. Without this behavior information, such trade-off decisions are difficult to make and are frequently left to the subjective judgement of the system designer or user.

Therefore, a need exists for apparatus and methods for analyzing the behavior of systems as system performance falls outside specified limits due to variations of components, especially with respect to system "brittleness" behavior. Brittleness is a system characteristic which describes the extent to which system performance degrades sharply, i.e, "fractures", as the performance of its components ranges over, and beyond toleranced limits.

BRIEF SUMMARY OF THE INVENTION

The invention provides a computer implemented tool for determining the brittleness of a system with respect to at least one system performance measure. The tool comprises a statistical analyzer configured to receive at least one operating parameter input "o", and to provide at least one performance function output, "f". The performance function output f provides an indication of system performance as a function of system operating parameter input o. A brittleness analyzer is coupled to the performance function output and is configured to provide a brittleness output based upon performance function f.

DETAILED DESCRIPTION OF THE INVENTION

Figure 1:
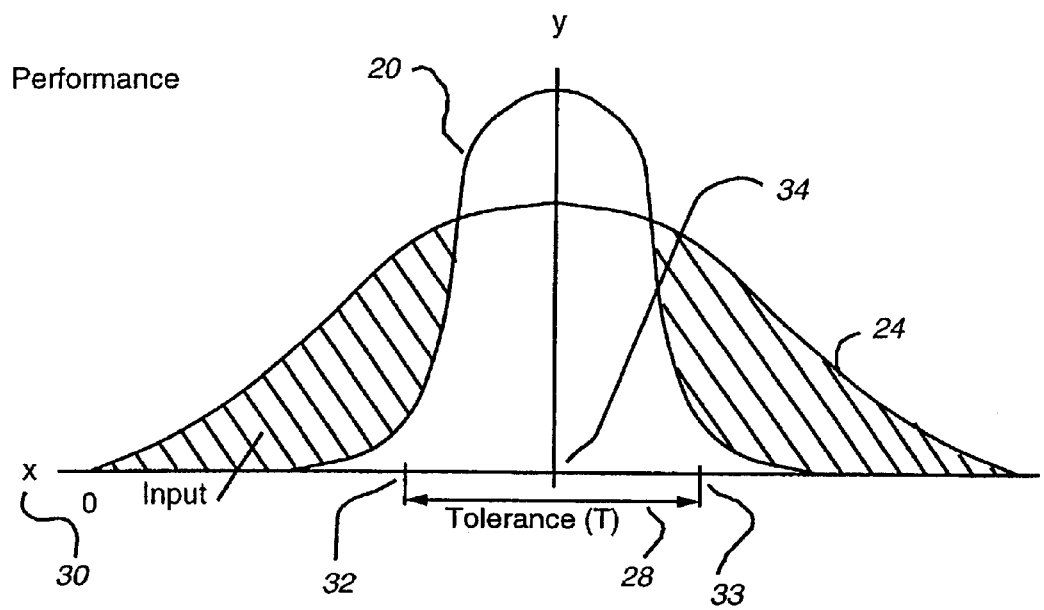
FIG. 1 is a graph illustrating brittle system performance in comparison with ductile system performance.

FIG. 1 is a graphical comparison of a brittle performance curve 20 and ductile performance curve 24. For purposes of this specification, "brittleness" refers to a system characteristic which describes the extent to which system performance degrades as system components are stressed. The term "system" as used herein refers to a regularly interacting and interdependent group of components operatively assembled and connected to form a unified whole in order to perform a function. The term system is also used to refer to a system comprising a single component. For purposes of this specification, components are characterized by at least one operating parameter. An operating parameter is a parameter which characterizes an aspect of the operation of the component. Examples of operating parameters of various systems include the number of nodes and the number of users of a computer network. A "brittle" system is a system whose performance as a whole tends to degrade sharply, i.e., fracture or disrupt, as at least one component is stressed. For purposes of this specification, a component is considered stressed whenever the value of at least one of its operating parameters is caused to deviate from a nominal value, whether or not the deviation exceeds upper or lower specification limits.

"Ductility" of a system is defined herein to be the tendency of a system to accommodate performance variations in components. The performance of a ductile system tends to degrade gracefully, in other words more slowly, than that of a brittle system as system components are stressed. The term "system performance" refers to the ability of a system to perform a given task as indicated by a performance measure. A performance measure of a system is a quantifiable performance characteristic of the system which indicates how well the system performs a given task. For example, throughput, measured in bits per second, is one performance measure used to indicate the ability of a processor to perform the task of processing data.

While the present invention finds many embodiments in the computer arts, the invention is not limited in scope to design of computer systems. On the contrary, the performance curves illustrated in FIG. 1 are intended to generally represent sample performance curves of a wide variety of systems. Examples of such systems include, but are not limited to, human and animal anatomical and physiological systems such as the circulatory system and the digestive system; mechanical systems, electromechanical systems, electrical systems and electronics systems, as well as biological, ecological and weather systems. As those of ordinary skill in the art of systems analysis will readily appreciate, there exist numerous other systems to which the principles of the present invention, once understood, may be readily applied.

Accordingly, FIG. 1 graphically illustrates the concepts of "brittleness" and "ductility" as they relate to system performance. In general, a performance curve graphically illustrates the performance of a system with respect to a selected performance measure, such as throughput, as the value of one or more operating parameters varies. As shown in FIG. 1, values taken by an operating parameter o of a system are plotted along the x-axis, and system performance results in terms of a selected performance measure P are plotted along the y-axis. In FIG. 1, "T" denotes the design tolerance of the operating parameter as plotted along the x-axis. For purposes of this specification the term "tolerance" means allowable deviation from a nominal, i.e., design, value. In one embodiment of the invention, performance curves are derived from actual measurements of system performance. In another embodiment of the invention performance curves are predicted by simulation of system performance.

According to the example illustrated in FIG. 1 when operating parameter o takes on its nominal value (indicated at 34), system performance as indicated on both performance curves 20 and 24 is at a maximum. In the example shown, the peak performance exhibited by performance curve 20 exceeds that of performance curve 24. However, as operating parameter o deviates from its nominal value and takes on values closer to its upper and lower specification limits (indicated at 33 and 32 respectively), performance curve 20 drops relatively sharply in comparison to performance curve 24 which degrades more gracefully. Thus, performance curve 20 is said to represent brittle system behavior while performance curve 24 is said to represent ductile system behavior. In the example shown in FIG. 1 performance curves 20 and 24 are intended to illustrate the performance of the same system as a single operating parameter of the system is varied.

The variation in the behavior of the example system, as indicated by the different shapes of its performance curves 20 and 24, is attributable to the influence of another variable on system performance. This curve-influencing variable, for purposes of this specification, is referred to as a state design variable. A state design variable, denoted herein by the letter "d", is a variable which tends to modify the relationship between operating parameters and system performance. An example of a state design variable related to computer networks is re-transmission time-out. In an example system whose performance measure is throughput and whose operating parameter is number of users, varying re-transmission time-out affects how quickly system performance degrades as the number of system users increases.

It is important to note that performance curves 20 and 24 correspond to a cosine function. For simplicity of explanation the cosine function is used in the examples and mathematical relationships described throughout this specification. However, as those of ordinary skill in the art will readily appreciate, system performance curves can correspond to a wide variety of functions, from simple periodic functions to vastly more complex functions. Accordingly, for all mathematical relationships described herein, the actual function of the particular system under analysis must be substituted where the cosine function now appears for the example system.

Figure 2:
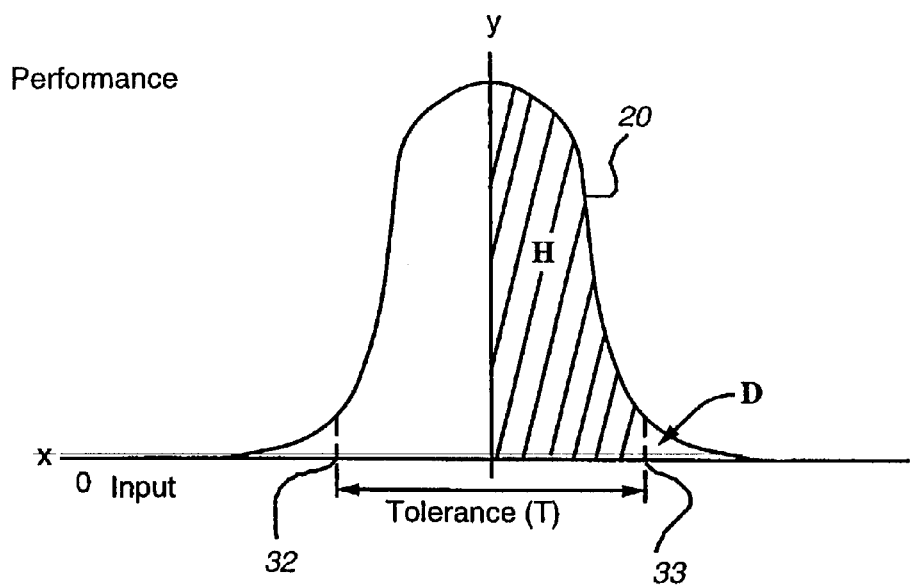
FIG. 2 is a graphical illustration of the hardness H of a system and the ductility D of a system.

FIG. 2 illustrates a method of calculating brittleness according to one embodiment of the invention. In the embodiment shown, brittleness b is calculated by dividing Hardness (H) by Ductility (D). For purposes of this specification the Hardness H of a system is defined to be its resistance to fracture or disruption. In one embodiment of the invention, a measure of Hardness is obtained by calculating the area under the curve described by f as operating parameter o ranges from its nominal value to its upper specification limit. In an alternative embodiment of the invention, Hardness is measured by calculating the area under the curve described by f as operating parameter o ranges from its nominal value to its lower specification limit.

In contrast to Hardness, Ductility (D) is defined as the ability of a system to accommodate variations in components. In one embodiment of the invention, ductility is represented by a numeral determined by calculating the area under the curve described by performance function f as operating parameter o ranges from an upper specification limit upward to the point where system performance P drops to zero. In an alternative embodiment of the invention D is represented by a numeral arrived at by calculating the area under the curve described by f as operating parameter o ranges from a lower specification limit downward to the point where system performance P drops to zero.

As those of ordinary skill in the art will recognize, various scaling or other factors may be devised to derive alternative measures of H and D based upon alternative mathematical representations of the concepts of hardness and ductility. All such alternative representations are intended to remain within the scope of the present invention.

Figure 3:
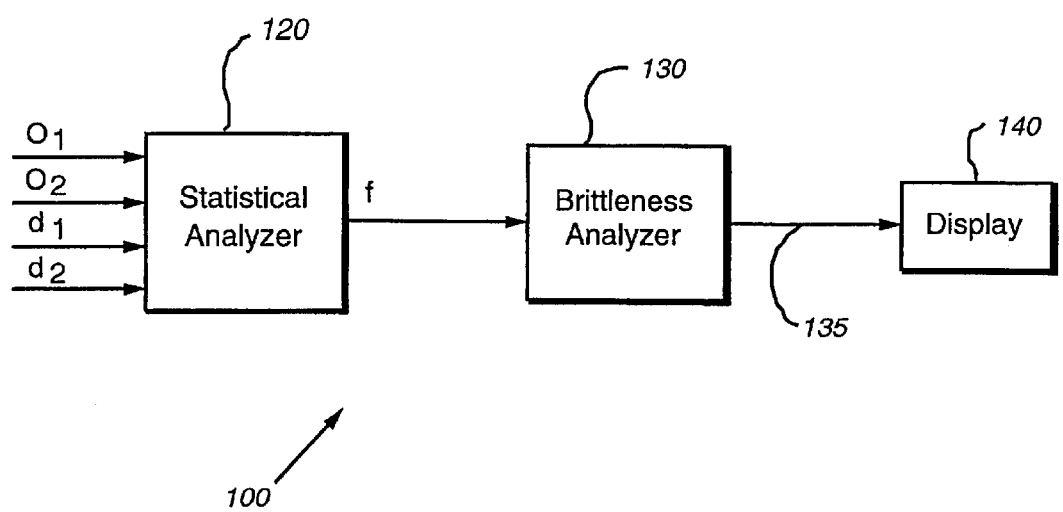
FIG. 3 is a block diagram of a tool for determining brittleness for a system according to the present invention.

FIG. 3 is a block diagram of a tool 100 for analyzing the brittleness, b, of a system. Tool 100 comprises a statistical analyzer 120 coupled to a brittleness analyzer 130. In one embodiment of the invention statistical analyzer 120 and brittleness analyzer 130 are implemented on a computer adapted to perform statistical analysis by means of off-the-shelf statistical analysis software. At least one such software product, Mathematica®, is readily commercially available from Wolfram Research, Inc.

As shown in FIG. 1 at least one operating parameter o, and at least one state design variable d, of a system under analysis are provided to statistical analyzer 120. Operating parameters o, and state design variables d of a system are obtained by characterizing system components in accordance with conventional systems engineering techniques. In one embodiment of the invention, design state variables d are held constant such that the output of statistical analyzer 120 is a function f which characterizes the performance of the system as a function of system operating parameters o. In one example embodiment of the invention the performance function of a system corresponds to a cosine function. In that case, the output f of statistical analyzer 120 is described in Mathematica® code as follows:

$$f[o\_]=Cos[o]; -Pi/(2)<=o<=Pi/(2), \quad [1]$$

for values of o ranging between –Pi/(2) and Pi/(2), and for values of o falling outside that range:

$$f[o\_]:=0.0/;Abs[o]>Pi/(2) \quad [2]$$

Statistical Analyzer 120 is coupled to brittleness analyzer 130 such that Brittleness Analyzer 130 receives output f. Brittleness Analyzer 130 determines the brittleness of the system under analysis by calculating the ratio of H to D for input function f. The calculation of H and D is described hereinabove.

Brittleness analyzer 130 provides at its output 135 an indication of the brittleness of the system based on the calculated ratio of H to D, for the given values of design state variables d. In one embodiment of the invention the indication is a numerical. In an alternative embodiment of the invention, the indication is an alphabetical rating, e.g. A, B, etc., corresponding to ranges of brittleness values. In yet another embodiment of the invention, the indication is presented graphically to an operator by means of a display.

In an alternative embodiment of the invention, at least one state design variable d is varied as at least one operating parameter o is varied. In this embodiment the output of statistical analyzer 120 for a cosine function is described in Mathematica® code as follows:

$$f[d\_,o\_]:=d\ Cos[d\ o]; -Pi/(2d)<=o<=Pi/(2, \quad [3]$$

for values of o ranging between –Pi/(2) and Pi/(2), and for values of o falling outside that range:

$$f[d\_,o\_]:=0.0/;Abs[d\ o]>Pi/(2d) \quad [4]$$

In the embodiment described above, function f, as characterized by equations 3 and 4 is provided to brittleness analyzer 130. Brittleness analyzer 130 provides a brittleness function $b_r$ based on function f. The function $b_r$ determines the brittleness of performance function based on state design variables d1 and d2 and the performance function f itself. In one embodiment of the invention Brittleness function $b_r$ is described in Mathematica® as follows:

br[f\_, tv\_, LSL\_List, USL\_list, d\_, d1\_, d2]:=Module
[{ }, Print ["H/D: ",
Nintegrate [f/.d->d1, {tv, LSL[[1]]}, LSL[[2]]}]–
Nintegrate [f/.d->d2, {tv,
USL[[1]], USL[[2]]}]];
Print ["slope at lower H/D: ", D[f/.d->d2, tv]/. Tv-> USL [[2]]; Print ["Slope at higher gain: ", D[f/.d ->d2, tv]/. Tv ->USL[[2]]];

Wherein tv denotes a tolerance variable and all other variables are defined hereinabove Still another embodiment of the invention provides a means for determining which design state variables have the most influence on system brittleness. In this embodiment, a statistical analysis software product (Mathematica® in one embodiment of the invention) is programmed in accordance with conventional multivariate analysis techniques to correlate design state variables d with brittleness outputs $b_r$ such that variables d having the greatest influence on system brittleness are identified. Once these "brittle" design state variables are identified, informed tradeoff decisions which consider system performance goals and target component tolerances can be made. Thus a tool for optimizing system design is provided.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A computer implemented tool for determining the brittleness of a system, the tool comprising:
   a statistical analyzer configured to receive at least one operating parameter input "o" and to provide at least one performance function output "f";
   said performance function output f providing an indication of system performance as a function of said at least one system operating parameter input o; and
   a brittleness analyzer coupled to said statistical analyzer, said brittleness analyzer configured to provide an indication of the brittleness of said system based upon said performance function output f.

2. The tool of claim 1 wherein said brittleness analyzer is configured to determine brittleness by calculating the ratio of Hardness (H) to Ductility (D) for said function f.

3. The tool of claim 1 wherein said statistical analyzer is further configured to receive at least one state design variable d.

4. The tool of claim 3 wherein performance function output f provides an indication of system performance as a function of said at least one system operating parameter input o, and as a function of said at least one state design variable d.

5. The tool of claim 4 wherein said indication of said system brittleness is a brittleness function $b_r$ of said system.

6. The tool of claim 1 wherein said performance function f is displayed to an operator.

7. The tool of claim 1 wherein said indication of system brittleness is displayed to an operator.

8. A tool for analyzing the brittleness of a system comprising:
   means for determining a performance function of said system with respect to at least one operating parameter of said system and for providing a performance function output representing said performance function;
   means for calculating a brittleness value for said performance function, said means for calculating a brittleness value coupled to said means for determining a performance function; and means for displaying said brittleness value to an operator.

9. The tool of claim 8 wherein said means for determining a performance function of said system, is configured to provide a performance function with respect to at least one operating parameter and with respect to at least one design state variable.

10. The tool of claim 9 wherein said means for calculating a brittleness value for said performance function is configured to calculate a brittleness function, and to provide an indication of said brittleness function to an operator.

11. A method for determining the brittleness of a system in which at least one operating parameter o influences at least one performance measure of said system, the method comprising the steps of:

describing said at least one performance measure as a function of said at least one operating parameter o by means of a performance function curve f;

determining the brittleness of said system by dividing an area B under said curve f, area B lying within predetermined limits of values of said operating parameter by an area D under said curve f, area D lying outside said predetermined limits to obtain a brittleness measure of said system.

12. The method of claim 11 wherein said predetermined limits are upper and lower specification limits.

13. A method for optimizing the performance of a system with respect to at least one system performance measure, the method comprising the steps of:

determining at least one operating parameter which influences said at least one performance measure;

determining at least one design state parameter which influences said at least one performance measure;

determining a relationship between said at least one performance measure and said at least one operating parameters based on said at least one design state parameter;

adjusting the value of at least one design state parameter such that a desired brittleness is achieved.

14. A method of achieving a target brittleness value for a system comprising the steps of:

selecting at least one state design variable and at least one operating parameter with respect to which said system performance is to be optimized;

selecting a target brittleness value for said system performance;

determining a performance function of said system with respect to said at least one operating parameter;

adjusting the value of said state design parameter until said performance function exhibits said target brittleness value.

* * * * *